May 10, 1938.　　C. H. WIDMAN ET AL　　2,117,049
REAR END VEHICLE CONSTRUCTION
Filed Feb. 1, 1934　　5 Sheets-Sheet 1
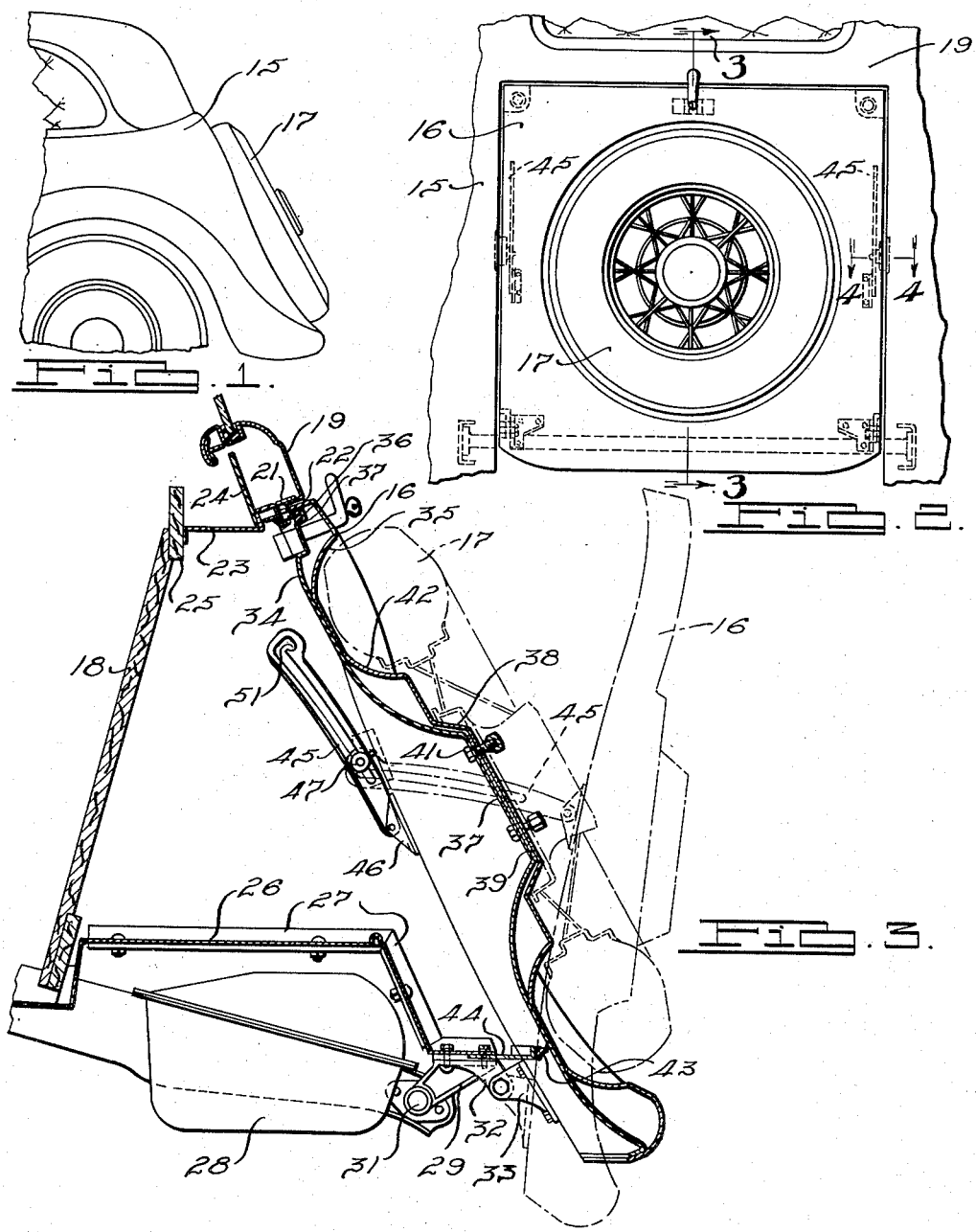
INVENTORS.
Charles H. Widman,
Fred J. Westrope.
BY
ATTORNEYS.

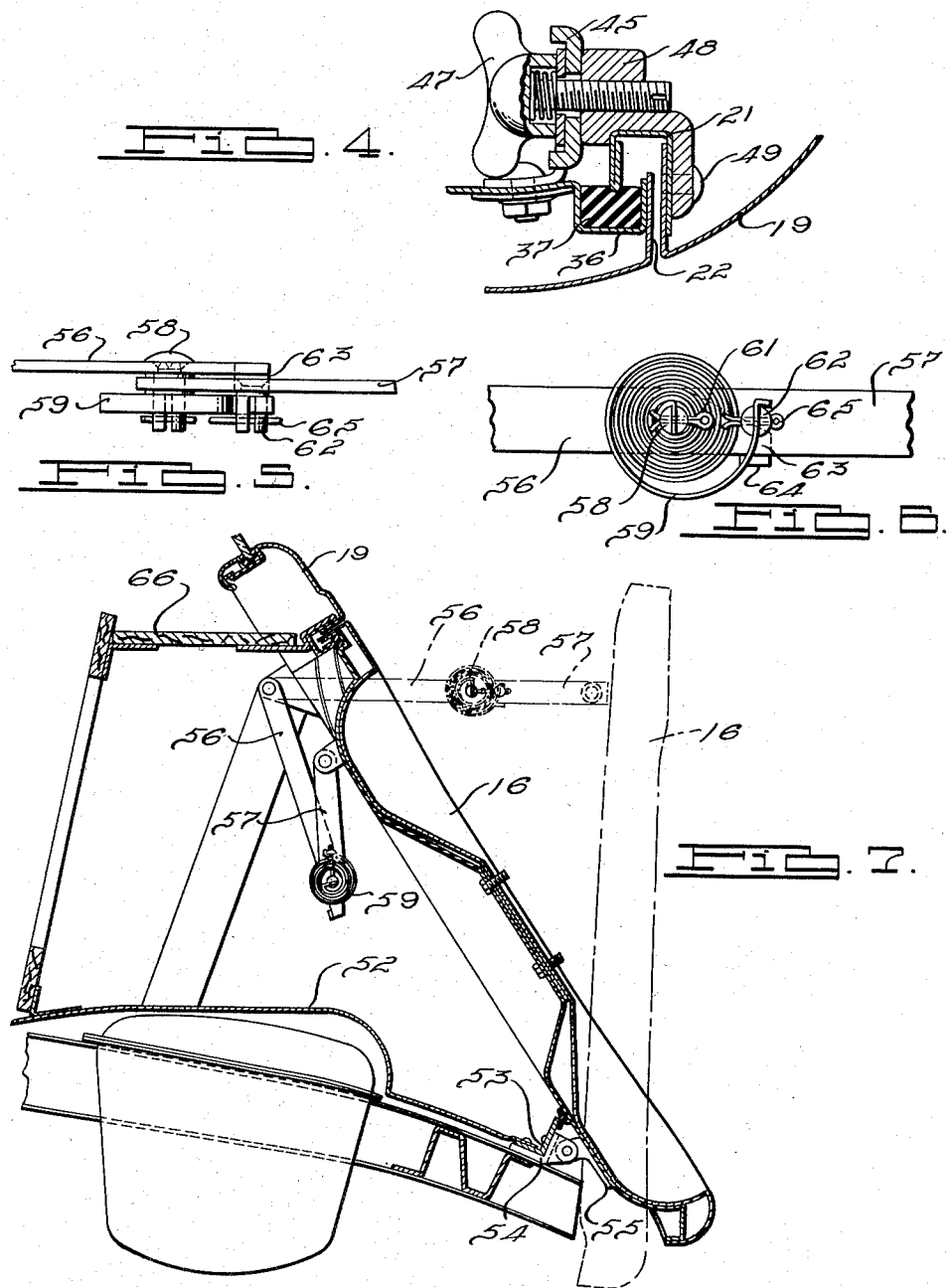

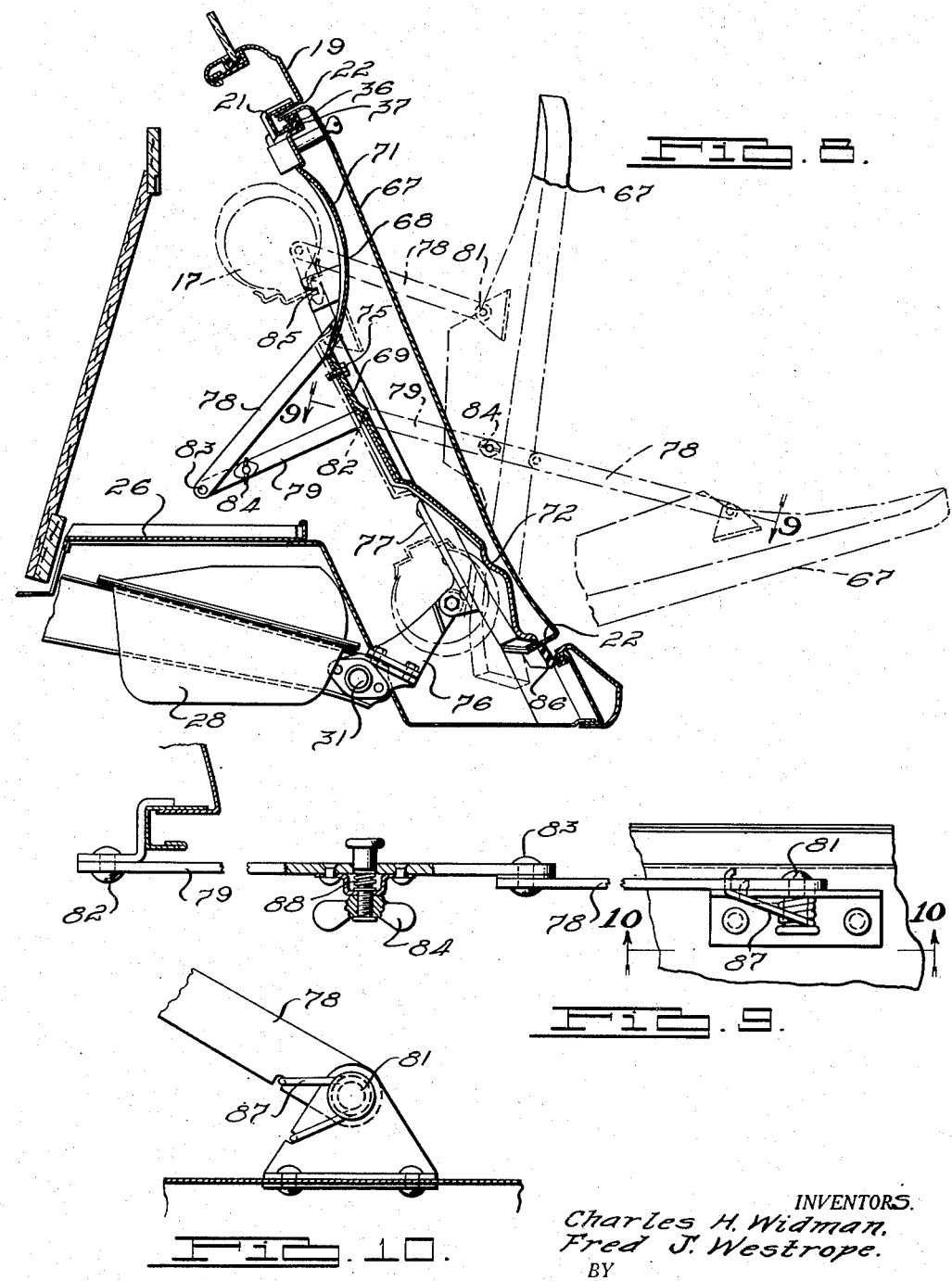

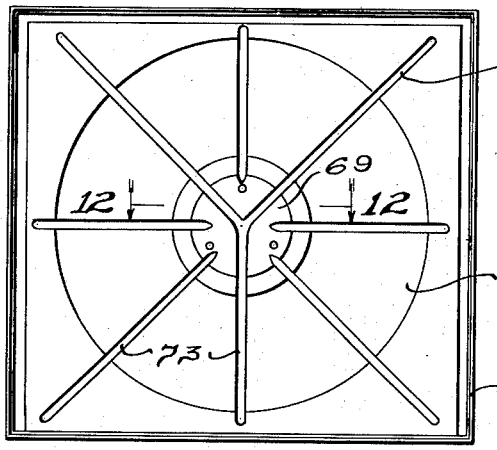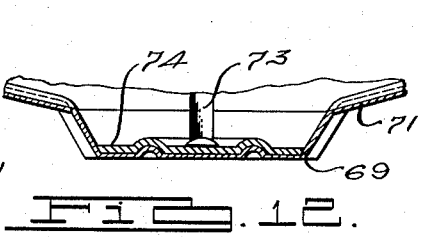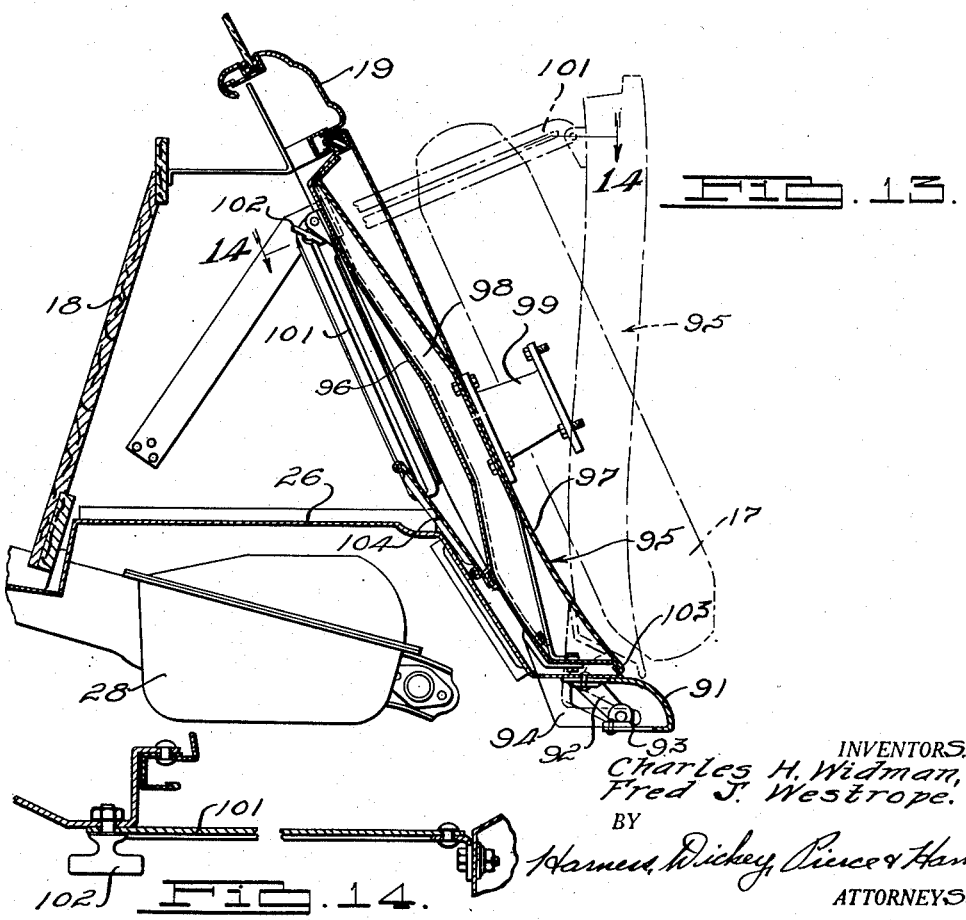

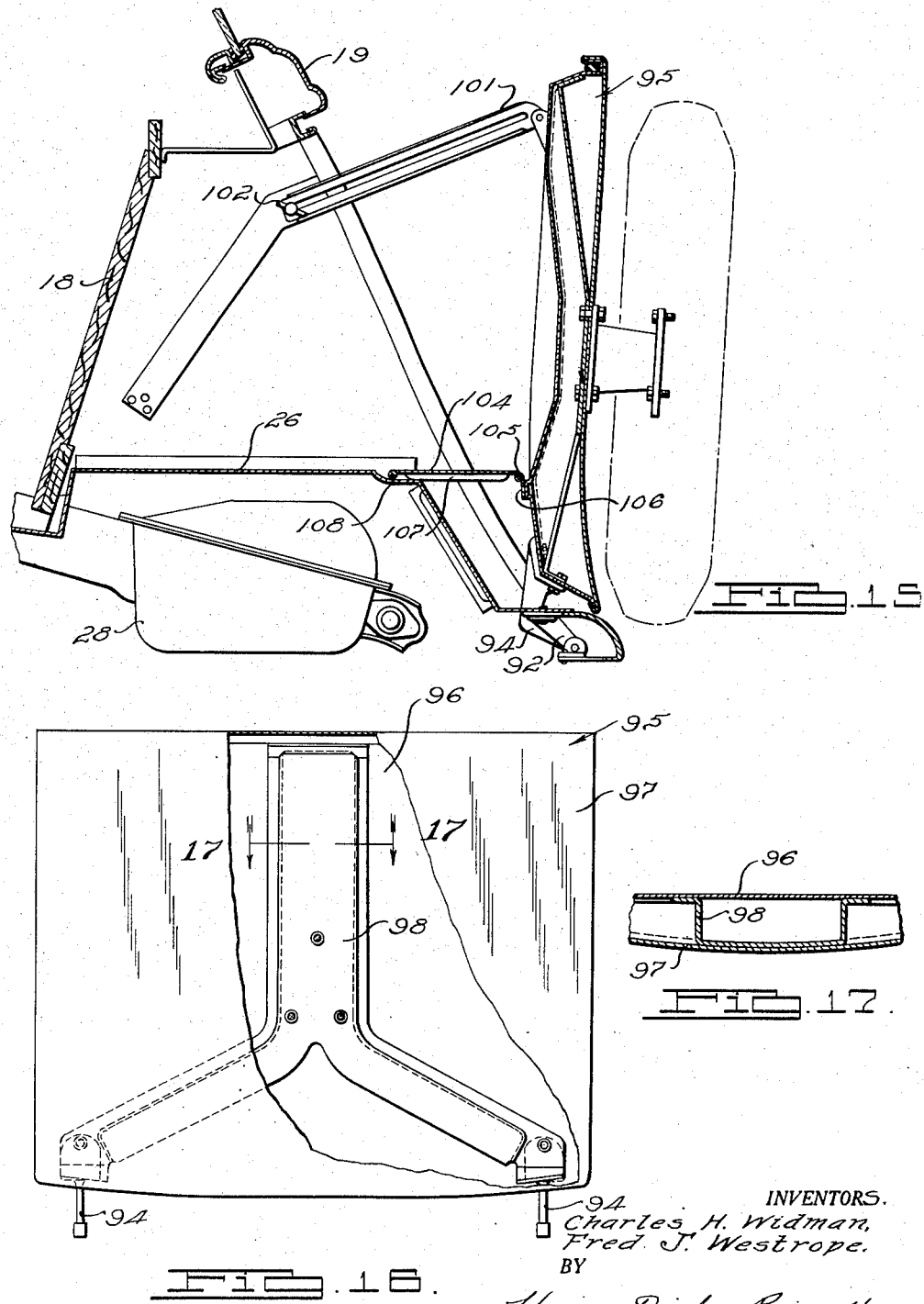

Patented May 10, 1938

2,117,049

UNITED STATES PATENT OFFICE 2,117,049

REAR END VEHICLE CONSTRUCTION

Charles H. Widman and Fred J. Westrope, Detroit, Mich., assignors to The Murray Corporation of America, a corporation of Delaware Application February 1, 1934, Serial No. 709,244

4 Claims. (Cl. 296—37)

Our invention relates to vehicle bodies and particularly to the rear compartment and the closure element therefor which embodies mounting means for a spare wheel.

Spare wheels have been usually mounted on a bracket supported to the vehicle chassis at the rear thereof. On the de luxe type of bodies the spare wheels are mounted in wheel wells on the sides thereof, and on sedan type of bodies the spare wheels have been mounted on brackets supported on the rear body paneling.

In the present instance, a vehicle of the sedan type is provided with a compartment in the rear having a compartment closure element in the nature of a door which is constructed in such manner as to form a support for the spare vehicle wheel. The wheel may be mounted exteriorly on the door or may be mounted on the inner surface thereof to be entirely hidden from view and locked in the compartment to be protected against theft.

Accordingly, the main objects of our invention are to provide a mounting in the door of a vehicle for supporting the wheel; to support a wheel on the inner surface of a door to have it entirely hidden from view and in a position in which it is readily removable; to provide a door having preformed surfaces upon which a spare wheel of the vehicle may be mounted; to construct a door for a rear compartment of a vehicle to constitute a closure for the compartment and preformed in such manner as to constitute a support for a spare wheel which is simple in construction, is rugged and which enhances rather than detracts from the appearance of the vehicle.

Other objects and features of novelty of our invention will be either specifically pointed out or will become apparent when referring, for a better understanding of our invention, to the following description taken in conjunction with the accompanying drawings wherein:

Figure 1 is a broken view, in side elevation, of the rear portion of a vehicle body embodying features of our invention, Fig. 2 is an enlarged broken rear view of the structure illustrated in Fig. 1, Fig. 3 is an enlarged sectional view of the structure illustrated in Fig. 2, taken on the line 3—3 thereof, Fig. 4 is an enlarged sectional view of the structure illustrated in Fig. 2, taken on the line 4—4 thereof, Fig. 5 is an enlarged broken plan view of the structure illustrated in Fig. 7, Fig. 6 is a view in elevation of the structure illustrated in Fig. 5, Fig. 7 is a sectional view of structure, similar to that illustrated in Fig. 3, showing a modified form thereof, Fig. 8 is a view of structure, similar to that illustrated in Fig. 3, showing a modified form thereof, Fig. 9 is an enlarged sectional view of the structure illustrated in Fig. 8, taken on the line 9—9 thereof, Fig. 10 is a sectional view of the structure illustrated in Fig. 9, taken on the line 10—10 thereof, Fig. 11 is a plan view of the inner surface of the door illustrated in Fig. 8, Fig. 12 is an enlarged sectional view of the structure illustrated in Fig. 11, taken on the line 12—12 thereof, Fig. 13 is a sectional view of structure similar to that illustrated in Fig. 7, showing a modified form thereof, Fig. 14 is an enlarged sectional view of the structure illustrated in Fig. 13, taken on the line 14—14 thereof, Fig. 15 is a view of the structure illustrated in Fig. 13, with the door in open position, Fig. 16 is a plan view, with parts broken away, of the door illustrated in Figs. 13 and 15 showing the bracing support for the wheel, and Fig. 17 is an enlarged sectional view of the structure illustrated in Fig. 16, taken on the line 17—17 thereof.

Referring to Figs. 1 to 4, we have illustrated a vehicle body 15 having, at the rear sloping panel portion thereof, a door 16 upon which a spare wheel 17 is mounted. The door encloses a compartment within the paneling rearwardly of a seat back 18 and is recessed to receive the wheel. The body is of conventional design except for the opening in the rear skirt portion for the compartment. The body paneling 19 is flanged inwardly at the edge of the opening, in engagement with a channel 21 at the top and sides of the opening for receiving a flange 22 on the door 16.

A filler element 23 joins the web of the channel element 21 to the cross brace 24 and to the top cross element 25 of the seat back 18 to provide strength to the marginal panel edge of the body. The bottom of the compartment is closed by the flooring 26 which rests upon the flange of the angle member 27 which is welded or otherwise secured to the inner surface of the body. The flooring is retained by suitable releasable securing means, such as the screws herein illustrated, for the purpose of permitting the installation and removal of a gasoline tank 28 which rests upon the chassis frame. The flooring 26 is disposed upwardly a sufficient amount to clear the tank, as illustrated, and it is to be understood that when the tank is otherwise disposed, the flooring may be lowered to provide more room in the compartment.

A bracket 29 is supported on a cross brace 31 of the chassis frame and supports a bracket 32 to which the door 16 is pivoted by a bracket 33 which is bolted or otherwise secured thereto. The door is made up of an inner panel 34 and an outer panel 35 which are preformed to provide the marginal flange 22 which is disposed within the channel 21 at the marginal edge of the compartment opening. The inner panel 34 is preformed at the edge to provide a channel 36 in which a rubber sealing element 37 is disposed for engaging the inner edge of the channel 21. The central portion of the panel 34 is pressed outwardly at 37 to mate with the pressed out portions 38 of the outer panel and between which a strengthening plate 39 is disposed. Studs 41 extend through the panels and plate for securing the wheel to the outwardly projecting portion 38 of the outer door panel.

Between the outwardly projecting portion 38 and the marginal edge of the door, the outer panel is preformed inwardly at 42 to form a well for receiving the tire and rim of the wheel, as clearly illustrated in Fig. 3. The wheel is recessed within the door paneling and in view of the inner and outer panel construction, material strength is added to the door. A suitable sealing element 43 is secured by a bottom plate 44 at the rear of the compartment floor 26 for the purpose of sealing the bottom of the compartment against the entrance of water.

A slotted arm 45 is pivoted to the door on the bracket 46, the slot thereof being disposed over a threaded thumb nut 47, as illustrated in Fig. 4, which is screwed into a boss 48 riveted at 49, or otherwise retained fixed to the marginal edge of the paneling 19 and channel 21. By this means, the door may be clamped to any desired open position and, when engaging an extending notch 51 in the slotted element 45, the arm retains the door against closing. It is necessary to first pull the door outwardly and raise the slotted arm 45 to close the door.

In Figs. 5, 6, and 7, we have shown a further extension of our invention, wherein a door 16 is formed substantially the same as the door 16 in the foregoing figures. In this construction the gas tank 28 is somewhat lowered so that the floor 52 may be mounted lower than that illustrated in Fig. 3, providing a larger compartment. A frame bar 53 extends across the rear of the body and supports brackets 54 on which brackets 55 of the door are pivoted. The door swings and is sealed in substantially the same manner as that illustrated in Fig. 3. A novel arm construction is provided for retaining the door in open position being made up of links 56 and 57 which are pivoted together by a pin 58 upon which a clock spring 59 is retained in fixed relation by a cotter pin 61. A stud 62 is carried by the link 57 and the end 63 of the link 56 and is flanged over to provide a stop 64. The outer end of the spring 59 is secured to the stud 62 by a cotter pin 65 and is so disposed as to wind the spring to provide further tension therein when the door is moved to closed position. The spring is primarily employed to retain the links 56 and 57 in aligned relation so as to retain the door in open position when employed to extend the luggage compartment. As a secondary use, the weight of the wheel in the door is offset somewhat so that the door may be more readily opened. The top panel element 66 of the compartment may be removable so that entrance may be had to the compartment from the inside of the vehicle so that small packages may be placed therein and removed therefrom without the necessity of opening the door.

In Figs. 8 to 13 inclusive, we have shown a further extension of our invention, wherein the wheel is mounted on the inner face of the door to provide a smooth outer face thereto. The body paneling 19 is the same as that illustrated in Fig. 3, having a compartment floor 26 thereon and having the door edge so formed as to seal with the outer edge of the channel element 21 provided in the marginal edge of the panel 19. The door is formed of a smooth outer panel 67 which is flanged inwardly at its outer edge at 22. The inner panel is preformed at its edge on the two sides and top to provide a channel 36 in which a rubber sealing element 37 is provided for engaging the inner edge of the channel 21.

An inner panel 68 is preformed outwardly at the center at 69 to provide a support for the hub of the wheel and is circularly indented at 71 about the hub for receiving the rim and tire. Suitable outwardly projecting lugs 72 are spaced about the depressed portion 71 for the purpose of engaging the tire and retaining it in fixed relation to the inner door paneling. In Figs. 11 and 12 we have illustrated the panel as being provided with a plurality of converging pressed-in portions 73 for providing strength to the panel and further provided with a plate 74 at the central hub portion 69 for the purpose of providing body thereto for the studs 75 which project therethrough and upon which the hub of the wheel is secured.

A bracket 76 is bolted to an extension of the cross brace 31 to which a bracket 77 is mounted in pivotal relation to the body at each side of the chassis frame. In Fig. 8 it will be noted that the door has two open positions one substantially perpendicular and one outwardly therefrom providing access to the bolts of the wheel. These positions are maintained by a pair of links 78 and 79 pivoted respectively to the door at 81 and to the body at 82. The links are pivoted together at 83 and a stud having a thumb nut 84 is carried by the link 79 which may engage a notch 84, provided at the marginal edge of the opening, to retain the link 79 in fixed relation to the marginal edge and retain the door in substantially vertical position. When a thumb nut 84 is screwed down upon the stud, the head end thereof is drawn in against the links 79 against a spring 88 to permit the head to clear the notch 85 so that the door may be opened to its full extent. When it is desired, however, to have the door in the position of forming an extended trunk compartment, the screw 84 is turned to have the head of the stud projected outwardly by the spring 88 to thereby engage the notch 85 to hold the door in intermediate position to form the extended compartment.

A suitable sealing element 86 may be provided at the bottom flange 22 of the door for engagement with the paneling at the lower marginal edge of the opening for sealing the opening against the ingress of water. A spring 87 is carried by the pivot 81 in a position to be compressed when the door is in its outermost position to cause the links to fold upwardly when the door is raised. In this construction the wheel is entirely hidden from view and is retained against theft by the lock upon the door. Further the door provides a smooth, clean appearance to the rear of the vehicle.

In Figs. 13 to 17, we have shown a further extension of our invention wherein the floor 26 of the compartment is extended to be joined to the rear skirt edge 91 of the body. The edge and extended paneling is braced by a bracket 92 carrying a pivot 93 on which an arm 94 is pivoted and secured to the rear compartment door 95. The compartment door is made of an inner panel 96 and an outer panel 97 having a reinforcing element 98 extending therebetween, preferably of channel section and joined to the outer panel 97 at the center to have a wheel-carrying flange 99 secured thereto. The edges of the outer and inner panels are flanged over in a similar manner as the constructions hereinbefore illustrated, to provide a seal to the door and form a box section structure which is light and sturdy and which supports the wheel supporting element 99 at the center.

We have illustrated the reinforcing element 98 more specifically in Fig. 16 wherein the element is split below the center and extended to engage the hinge brackets 94 and the lock of the door. It is to be understood that a T-shaped bracket could be formed within the purview of our invention, extending between the hinge brackets 94 and having a body portion extending upwardly to engage the door lock, as in the construction illustrated. In this manner, the wheel is supported on the door between the two hinges and lock, which are the points of support for the door. This provides rigidity to the wheel support and retains the wheel firmly fixed to the body. In Fig. 17 we have shown a section of the elements 98 illustrating the channel section thereof with the web engaging the outer panel 97 and the flanges turned outwardly to engage the inner panel 96.

In referring to Figs. 13 and 15, we have shown a further extension of our invention wherein the space between the flooring 26 and the door 95, when in open position, is spanned by an element 104 which is hinged at 105 and secured to the door by the hinge leaf portion 106. The element 104 is provided with a plurality of spaced, pressed-out portions 107 for the purpose of adding strength thereto. The element 104 operates by its own weight and is to move to an angular position, as illustrated in Fig. 13, when the door is closed. It is moved to a horizontal position in the extension of the flooring 26 by its own weight when the door is moved to open position, as illustrated in Fig. 15. A recessed portion 108 is provided in the flooring 26 for receiving the end of the element 104 to have its surface disposed in continuation of the surface of the flooring 26 to extend the flooring of the compartment.

A slotted link 101 is pivoted to the door having the slot therein disposed over a thumb nut 102 to clamp the door to any desired position. In view of the shape of the arm 94, the lower flange 103 of the door follows the curve of the skirt portion 91 of the body, so as to clear it when moved to open position. This construction is exceedingly simple, provides a strong support for the wheel supporting element, and is an exceptionally sturdy construction in view of the box section formation of the inner and outer panels and the reinforcing element provided therein.

While we have described and illustrated several embodiments of our invention, it will be apparent to those skilled in the art that various changes, omissions, additions and substitutions may be made herein without departing from the spirit and scope of our invention, as set forth in the accompanying claims.

We claim as our invention:

1. A vehicle body having an opening to provide access to a compartment, a door for said compartment including mated inner and outer panels sloping forwardly of the vertical, said inner panel being preformed to provide a central extending portion and a depressed portion thereabout, means for mounting a wheel on said central extending portion, and interconnecting means between said door and body for securing said door in substantially vertical position and in horizontal position to provide access to the compartment in the first instance and access to the wheel in the second instance.

2. A vehicle body having an opening to provide access to a compartment, a door for said compartment tilted forwardly of the vertical, means on the inner face of said door for securing a wheel thereon to be locked from view within said compartment, and means for positioning said door in substantially vertical position to provide access to said compartment and in horizontal position to provide access to said wheel.

3. In a vehicle body having a compartment therein, a door for said compartment comprising a pair of substantially co-extensive sheet metal panels secured together to provide a structure of hollow box-section, the outer panel constituting when the door is closed a substantial continuation of the surface of the body, the inner of said panels being preformed to strengthen the door structure and to provide a raised central portion adapted to engage and provide a mounting for the hub portion of a spare wheel.

4. In a vehicle body having a compartment therein, a door for said compartment comprising a pair of substantially co-extensive sheet metal panels secured together in their marginal edges to provide a structure of hollow box section, the outer panel constituting when the door is closed, a substantial continuation of the surface of the body, the inner of said panels being preformed to strengthen said door structure and to provide a raised central portion adapted to engage and mount the hub of a spare wheel and having an annular depressed zone around such central portion to receive the tire of such wheel and means on said central portion for anchoring said spare wheel in position thereon.

CHARLES H. WIDMAN.
FRED J. WESTROPE.